(12) United States Patent
Hart

(10) Patent No.: US 12,077,195 B2
(45) Date of Patent: Sep. 3, 2024

(54) MANWAY ASSEMBLIES FOR RAILROAD CARS

(71) Applicant: Gunderson LLC, Portland, OR (US)

(72) Inventor: Scott Hart, Milwaukie, OR (US)

(73) Assignee: Gunderson LLC, Lake Oswego, OR (US)

( * ) Notice: Subject to any disclaimer, the term of this patent is extended or adjusted under 35 U.S.C. 154(b) by 839 days.

(21) Appl. No.: 17/172,445

(22) Filed: Feb. 10, 2021

(65) Prior Publication Data

US 2022/0250660 A1 Aug. 11, 2022

(51) Int. Cl.
*B65D 90/00* (2006.01)

(52) U.S. Cl.
CPC ...................... *B61D 5/08* (2013.01)

(58) Field of Classification Search
CPC ........................................ B61D 5/08
See application file for complete search history.

(56) References Cited

U.S. PATENT DOCUMENTS

| | | |
|---|---|---|
| 1,630,672 A | 5/1927 | Sage |
| 3,907,157 A | 9/1975 | Beattie |
| 6,401,958 B1 * | 6/2002 | Foss ............ F16J 13/06 220/320 |
| 7,850,214 B2 | 12/2010 | Ambriiz |
| 8,166,891 B2 * | 5/2012 | Borowski ............ B61D 5/08 105/377.07 |
| 10,464,580 B2 | 11/2019 | Schmidt et al. |
| 2005/0205576 A1 * | 9/2005 | Bednara ............ H05K 5/061 220/327 |
| 2016/0348846 A1 | 12/2016 | Ambriz |

FOREIGN PATENT DOCUMENTS

WO 2017100684 A1 6/2017

OTHER PUBLICATIONS

Baier Rail "Benefits of The New Manway" Obtained from https://www.baierrail.com/benefits/, Oct. 28, 2020, 4 pages.
U.S. Department of Transportation, Federal Railroad Administration, Office of Safety Hazardous Materials Division, "Tank Car Manway Assembly Inspection", dated Aug. 30, 2018, 75 pages.

* cited by examiner

*Primary Examiner* — Scott A Browne
(74) *Attorney, Agent, or Firm* — Chernoff, Vilhauer, McClung & Stenzel, LLP

(57) ABSTRACT

Manway assemblies for railroad tank cars are disclosed. In some embodiments, the manway assemblies include a cover having a perimeter portion with a plurality of spaced grooves. The manway assemblies additionally include a plurality of spaced fasteners pivotably attached to the nozzle adjacent to the opening. The manway assemblies further include an interference member attached to the cover adjacent to at least one groove. The interference member prevents pivoting of the at least one fastener from a secured position in which the fastener is received in a corresponding groove, to an unsecured position in which the fastener is spaced from the corresponding groove when the cover is in a closed position. The interference member allows pivoting of the at least one fastener from the secured position to the unsecured position when the cover is in a partially open position in which pressure contained within the railroad tank car is vented.

8 Claims, 5 Drawing Sheets

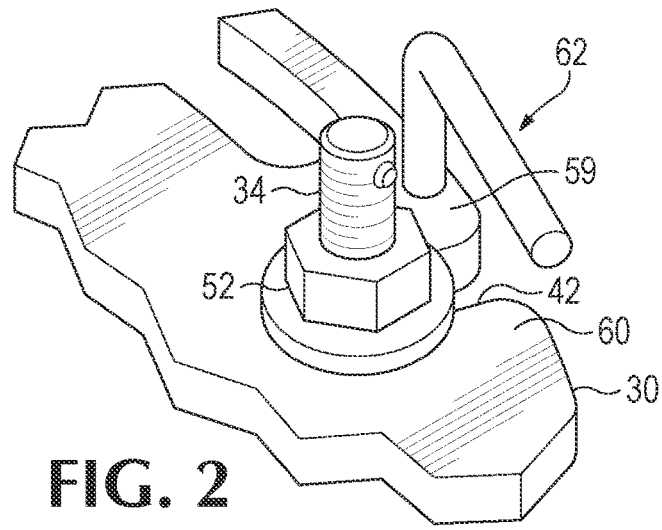
FIG. 2
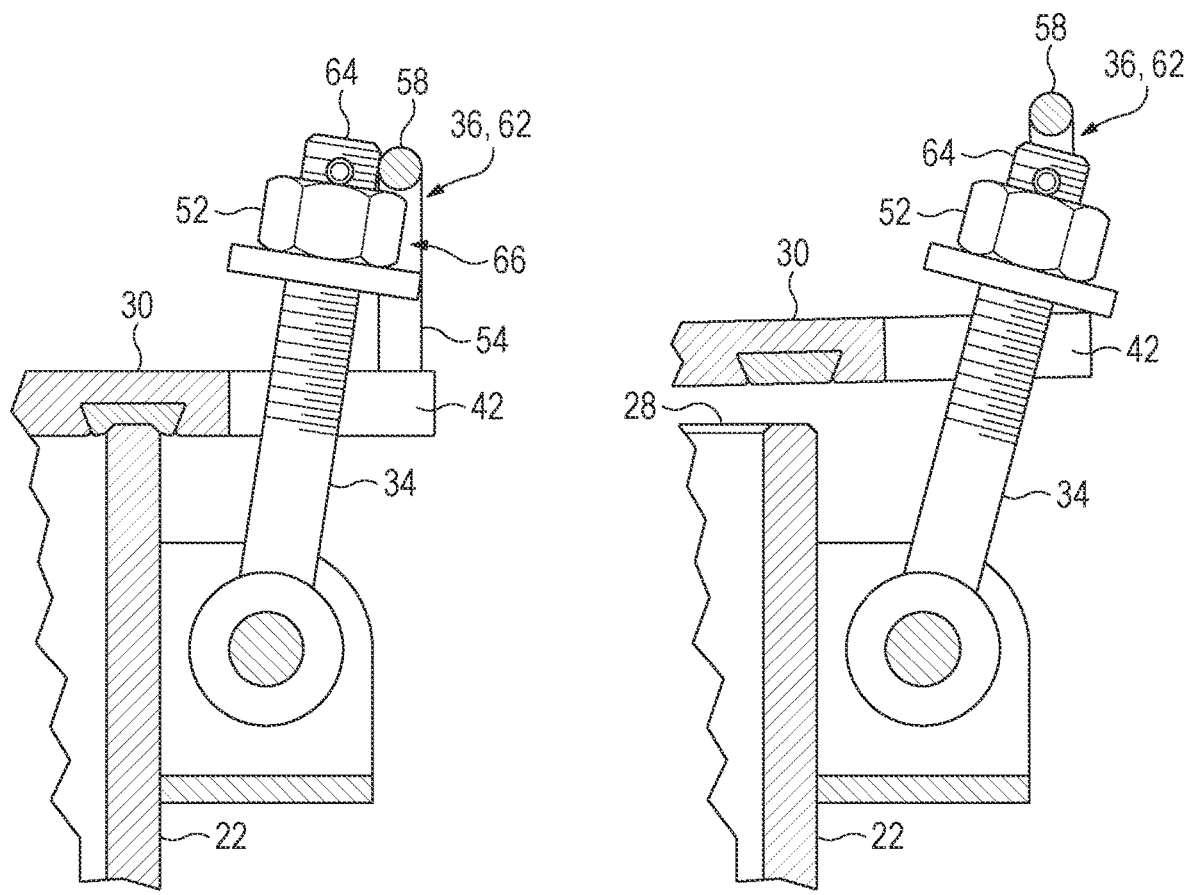
FIG. 3  FIG. 4

MANWAY ASSEMBLIES FOR RAILROAD CARS

BACKGROUND OF THE INVENTION

The present application relates to railroad cars and, in particular, to manway assemblies for railroad cars, such as railroad tank cars.

Railroad tank cars generally include a tank body mounted on a pair of wheel trucks. One or more nozzles are mounted on the tank body and a manway cover is positioned on top of the nozzle(s). Manways are used for several purposes include dome loading or unloading, entry into the tank car, venting (by opening the manway cover), access to view gauging level and commodity sampling. The primary use of the manway at the loading rack is to open for dome loading, while the primary use at the unloading rack is for venting.

The contents of tank cars may be pressurized (e.g., because of temperature changes and/or pressurized materials contained within the tank cars) so it is important for an operator not to completely open the manway cover without first releasing the pressure from within the enclosure of the tank body. Failure to release the pressure or vent may result in injuries. Many prior art systems that address the above problems require modified eyebolts and/or other fasteners.

What is desired, then, is an improved manway assembly that mechanically prevents an operator from completely opening the manway cover without first releasing the pressure from within the tank body without the need to use modified eyebolts and/or other fasteners.

SUMMARY OF THE INVENTION

A manway assembly as disclosed herein provides answers to some of the previously-mentioned shortcomings of previously known manway assemblies.

In one embodiment, the manway assembly includes a cover, fasteners that are received in grooves around the perimeter of the cover, and an interference member to prevent full opening of the manway cover prior to venting pressure from within the tank body.

In one embodiment, the interference member prevents one or more fasteners from being removed from the groove(s) of the cover unless the pressure from within the tank body is released.

In one embodiment, the interference member may be a U-shaped or L-shaped member attached to the manway cover.

In one embodiment, the interference member may be fixedly or pivotably attached to the manway cover.

The foregoing and other objectives and features will be more readily understood upon consideration of the following detailed description taken in conjunction with the accompanying drawings.

BRIEF DESCRIPTION OF THE SEVERAL DRAWINGS

FIG. 2 is a partial view of the manway assembly of FIG. 1, showing another example of an interference member of the present disclosure.

FIG. 3 is a sectional view of the manway assembly of FIG. 1 taken along lines 3-3 in FIG. 1, showing the interference member of FIG. 1 or 2 blocking the pivoting of a fastener away from a groove of the cover when the cover is completely closed.

FIG. 4 is sectional view of the manway assembly of FIG. 3, showing the interference member of FIG. 1 or 2 spaced from the fastener when the cover is partially open to allow pivoting of the fastener away from the groove of the cover.

DETAILED DESCRIPTION OF PREFERRED EMBODIMENTS

Figure 1:
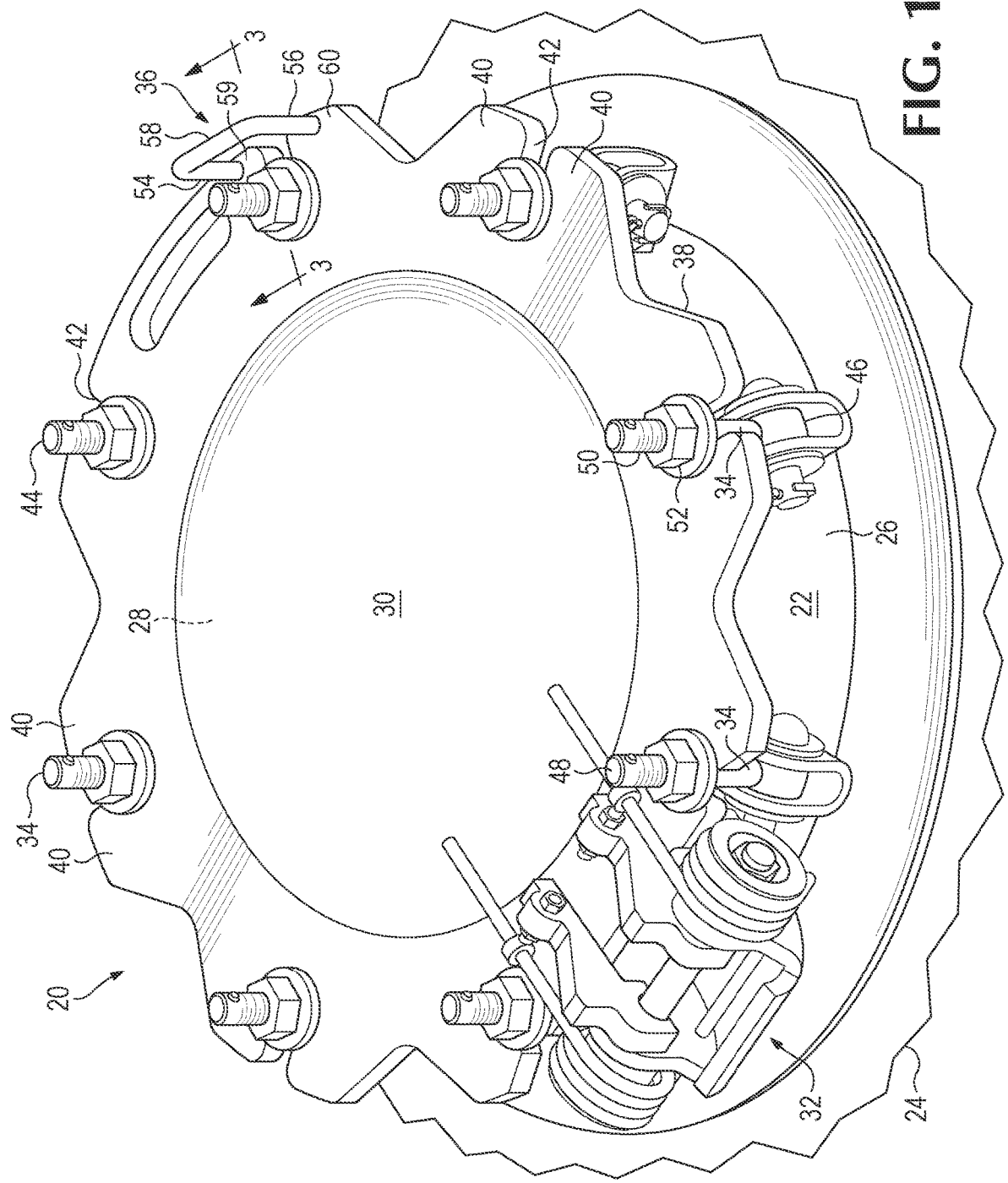
FIG. 1 is an isometric view of the manway assembly with a cover, showing an example of an interference member of the present disclosure.

Referring now to the drawings that form a portion of the disclosure herein, FIG. 1 shows a manway assembly 20 incorporating a novel construction preventing an operator from completely opening the manway cover without first releasing the pressure from within the tank body by comparison with previously known manway assemblies. Manway assembly 20 is mounted on the top of a nozzle assembly 22, which is positioned on top of a tank car body 24. A nozzle 26 of nozzle assembly 22 defines an opening or manway 28 for accessing the interior of tank car body 24.

Manway assembly 20 includes a manway cover or cover 30, a hinge assembly or hinge 32, a plurality of fasteners 34, and at least one interference member 36. Cover 30 includes a perimeter portion 38 with a plurality of edge portions 40. Several adjacent pairs of edge portions 40 each define a groove 42 therebetween forming a plurality of grooves 42 around the perimeter portion of cover 30. Perimeter portion 38 may be any suitable shape. In the example shown in FIG. 1, perimeter portion 38 has a generally circular shape with "jagged" edges formed by edge portions 40. In other embodiments, perimeter portion may have a circular or other shape without the "jagged" edges with grooves 42 spaced around that portion.

Hinge 32 pivotably attaches cover 30 to nozzle 26 to allow the cover to pivot among a plurality of positions, which includes a closed position, a partially open position, and a fully open position. In the closed position, the opening defined by nozzle 26 is generally covered or sealed by cover 30. In other words, the pressure within tank car body 24 is maintained. In the partially open position, cover 30 is spaced from opening 28 sufficient enough to allow pressure contained within tank car body 24 to be vented or exhausted. In the completely open position, cover 30 is spaced from opening 28 sufficient enough to provide full or almost full access to the opening. In other words, the opening is generally uncovered, which may be at or toward the end of the range of positions provide by hinge 32. In some embodiments, cover 30 may be about or more than ninety degrees from opening 28 in the completely open position.

Fasteners 34 are pivotably attached to nozzle 26 adjacent to opening 28 in a spaced relationship with each fastener 34 positioned to be received in a corresponding groove 42. Fasteners 34 are pivotable between a secured position in which the fasteners are received in their corresponding grooves to secure or lock cover 30 in the closed position, and an unsecured position in which the fasteners are spaced from their corresponding grooves (or not received in their corresponding grooves) allowing an operator to move cover 30 from the closed position toward the partially open and fully open positions. Fasteners 34 may be any suitable form(s). In the example shown in FIG. 1, fasteners 34 are in the form of eyebolts 44 having a loop portion 46 and a stem portion 48. The loop portion is pivotably attached to the nozzle. Stem portion 48 of eyebolts 44 is sized to be received in grooves 42 and includes plurality of threads 50 for receiving nuts 52 to secure the eyebolts in their corresponding grooves 42. Eyebolts 44 are conventional eyebolts that do not include cross pins, shoulders, and/or other structure(s) attached and/or mounted to the loop and/or stem portions. Additionally, eyebolts 44 are used only with conventional eyebolts and do not require any collars and/or other structure(s) used in combination with eyebolts 44 to secure cover 30 in the closed position.

Interference member(s) 36 are attached to cover 30 adjacent to one or more grooves 42. The interference member(s) include a first end portion 54, a second end portion 56, and a central portion 58 disposed between the first and second side or end portions. In the example shown in FIG. 1, first end portion 54 is attached to a first edge portion 59 of cover 30 and second end portion 56 is attached to a second edge portion 60 (with the first and second edge portions spaced to define a groove 42 therebetween). The first and second end portions extends perpendicularly of cover 30 (or the plane defined by cover 30) and center portion 58 extends transversely (or parallel to cover 30 or the plane defined by cover 30) to connect the first and second end portions. Alternatively, interference member 36 may be attached to cover 30 only at first edge portion 59 or only at second edge portion 60.

Manway assembly 20 may include any suitable number of interference members 36. In the example shown in FIG. 1, a single interference member 36 is shown attached to cover 30 and adjacent a single groove 42. However, other examples of manway assembly 20 may include two or more interference members 36 attached to cover 30 and adjacent two or more grooves 42. Interference member(s) 36 may be any suitable shape. In the example shown in FIG. 1, interference member 36 is U-shaped. However, interference member(s) 36 may be one or more other shapes, such as L-, C-, D-, J-shaped and/or other shapes. Another example of interference member 36 is shown in FIG. 2 as a L-shaped member, which is generally indicated at 62.

Referring to FIGS. 3-4, interference member 36 or 62 prevents or blocks fastener 34 from pivoting from the secured position to the unsecured position (or from being removed from groove 42) when cover 30 is in the closed position (such as shown in FIG. 3). In the example shown in FIGS. 3-4, an end portion 64 of fastener 34 contacts central portion 58 to prevent pivoting of fastener 34. However, when cover 30 is moved to the partially open position (such as shown in FIG. 4) and the pressure inside the tank car body is vented or exhausted, interference member 36 or 62 is spaced from fastener 34 relative to the closed position and allows a user to pivot fastener 34 from the secured position to the unsecured position (or allows the user to remove fastener 34 from groove 42). In the example shown in FIGS. 3-4, end portion 64 of fastener 34 can go underneath central portion 58 of interference member 36 or 62, which is between first end portion 54 and second end portion 56 when interference member 36 is used, when cover 30 is in the partially open position. In other words, end portion 64 of fastener 34 moves through a passageway 66 defined between central portion 58 and cover 30 (and/or between first end portion 54 and second end portion 56) when cover 30 is in the partially open position.

Figure 5:
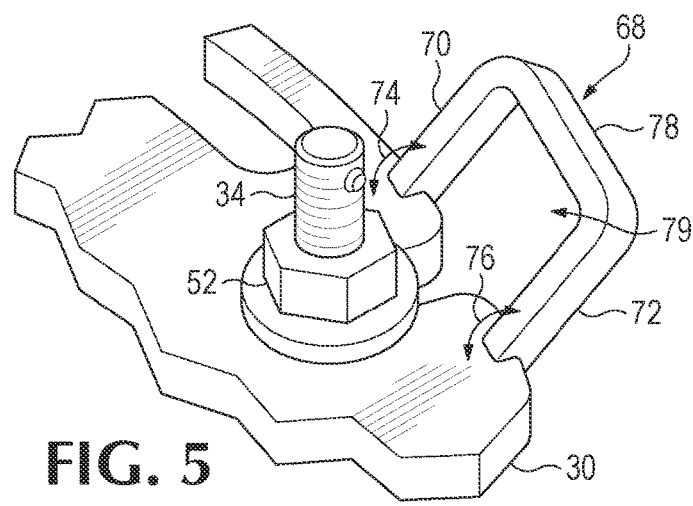
FIG. 5 is a partial view of the manway assembly of FIG. 1, showing an additional example of an interference member of the present disclosure.

Referring to FIG. 5, another example of interference member 36 is shown and is generally indicated at 68. Unlike interference members 36 and 62, interference member 68 does not extend perpendicularly from cover 30. Instead, first and second side or end portions 70, 72 of interference member 68 form obtuse angles 74, 76 with cover 30. A central portion 78 extends between and transverse the first and second end portions. Additionally, interference member 68 includes a square cross-section instead of a circular cross-section. The example of FIG. 5 may provide for better access to fasteners 34 (such as access to nuts 52) when the fasteners are in the secured position.

Figures 6, 7:
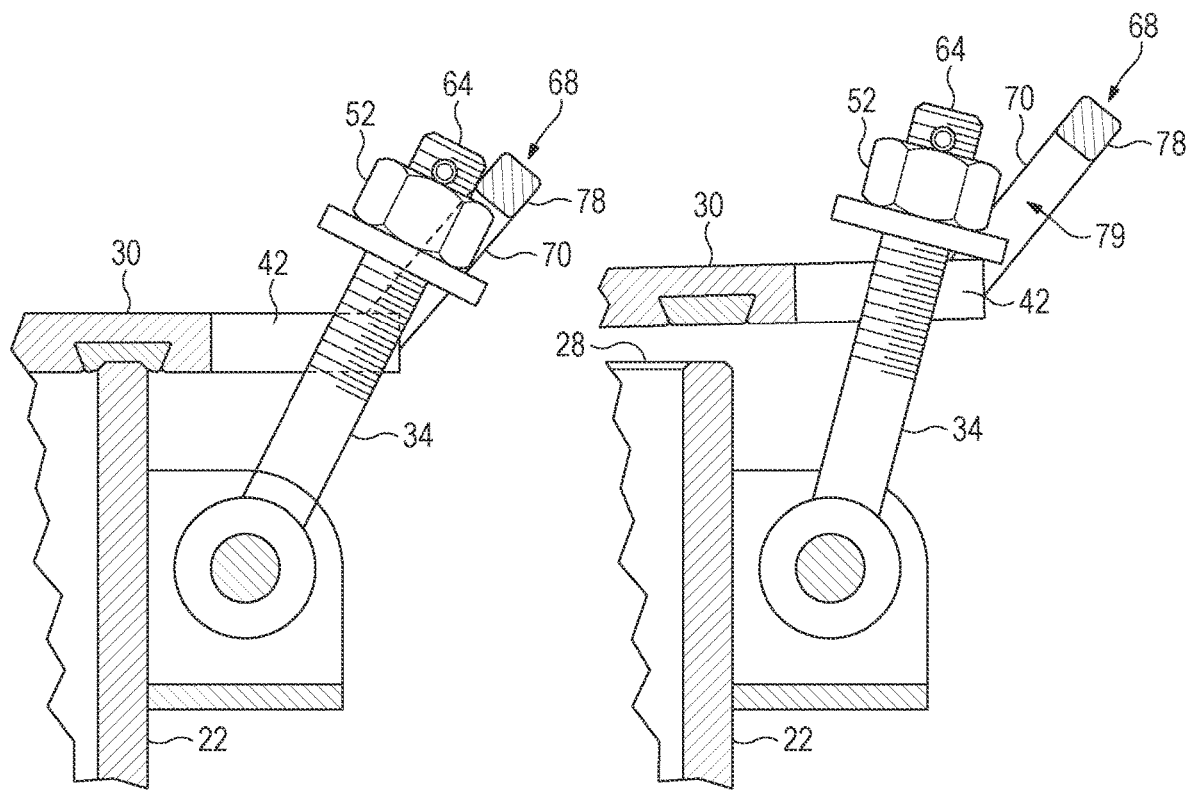
FIG. 6 is a sectional view of the manway assembly of FIG. 1 taken along lines 3-3 in FIG. 1, showing the interference member of FIG. 5 blocking the pivoting of a fastener away from a groove of the cover when the cover is completely closed.
FIG. 7 is a sectional view of the manway assembly of FIG. 6, showing the interference member of FIG. 6 spaced from the fastener when the cover is partially open to allow pivoting of the fastener away from the groove of the cover.

Referring to FIGS. 6-7, interference member 68 prevents or blocks fastener 34 from pivoting from the secured position to the unsecured position (or from being removed from groove 42) when cover 30 is in the closed position (such as shown in FIG. 6). In the example shown in FIGS. 6-7, end portion 64 of fastener 34 contacts central portion 78 to prevent pivoting of fastener 34. However, when cover 30 is moved to the partially open position (such as shown in FIG. 7) and the pressure inside the tank car body is vented or exhausted, interference member 68 is spaced from fastener 34 relative to the closed position and allows a user to pivot fastener 34 from the secured position to the unsecured position (or allows the user to remove fastener 34 from groove 42). In the example shown in FIGS. 6-7, end portion 64 of fastener 34 can go underneath central portion 78 of interference member 68, which is between first end portion 70 and second end portion 72, when cover 30 is in the partially open position. In other words, end portion 64 of fastener 34 moves through a passageway 79 defined between central portion 78 and cover 30 and between first end portion 70 and second end portion 72 when cover 30 is in the partially open position.

Figure 8:
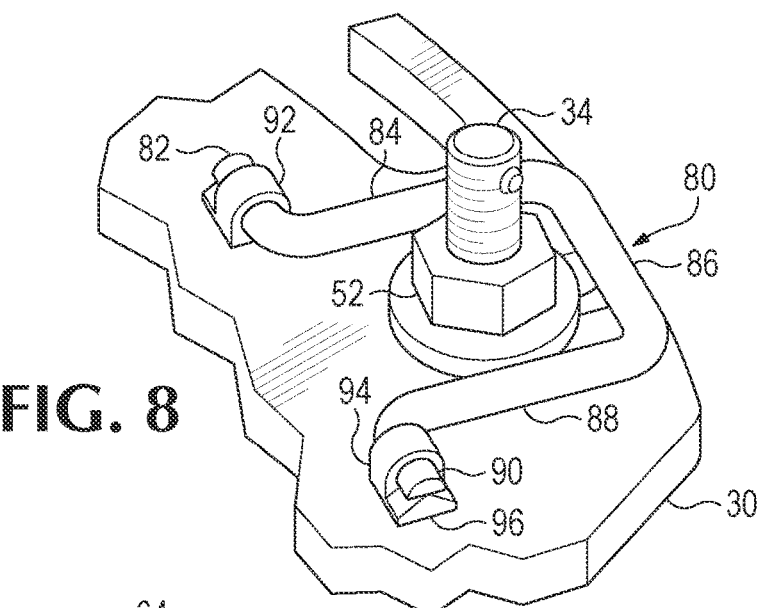
FIG. 8 is a partial view of the manway assembly of FIG. 1, showing a further example of an interference member of the present disclosure.

Referring to FIG. 8, another example of interference member 36 is shown and generally indicated at 80. Unlike interference members 36, 62, and 68 (which are fixedly attached to cover 30), interference member 80 is pivotably attached to cover 30 such that interference member pivots between a retracted position in which at least a portion of the interference member is on cover 30 and/or in which interference member 80 is generally parallel with cover 30, and an extended position in which interference member 80 is spaced from cover 30 relative to the retracted position. Interference member 80 includes a first interference connector portion 82, a first side portion 84, a top portion 86, a second side portion 88, and a second interference connector portion 90. First and second interference connector portions 82 and 90 are received in first and second cover connector portions 92 and 94 attached to (or formed with) cover 30, respectively.

In some examples, the first and/or second interference connector portions include a pivot stop 96 attached to cover 30 to prevent interference member 80 from being pivoted from the retracted position to beyond or past the extended position to prevent inadvertent removal of fastener 34 when cover 30 is in the closed position. In other words, pivot stop 96 prevents pivoting of interference member 80 to one or more positions that no longer block or prevent pivoting of fastener 34 from the secured position to the unsecured position when cover 30 is in the closed position. Additionally, pivot stop 96 prevents interference member 80 from being in a position (such as 180 degrees from what is shown in FIG. 8) that allows fastener 34 to be inserted into groove 42 without interference member being in either the extended or retracted position. In other words, pivot stop 96 prevents the securing of cover 30 in the closed position with interference member 80 in a position in which it would not be able to block or prevent pivoting of fastener out of groove 42 when cover 30 is being moved to the completely open position. In the example shown in FIG. 8, pivot stop 96 is a triangular member that interacts with second interference connector portion 90, which has a shape of a cylindrical segment with the planar surface contacting the triangular member of pivot stop 96.

Figure 9:
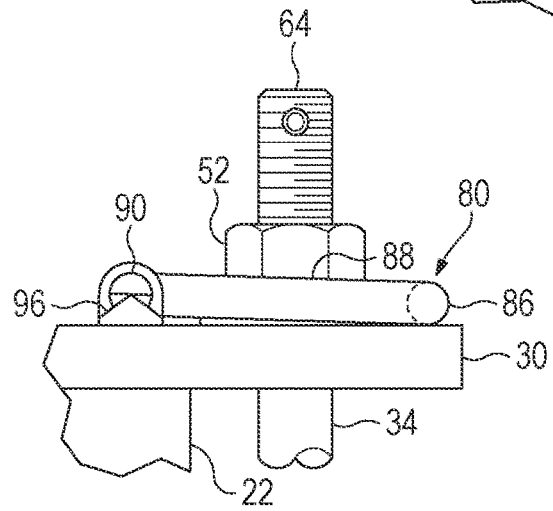
FIG. 9 is a partial side view of the manway assembly of FIG. 8, showing the interference member in a retracted position and blocking the pivoting of a fastener away from a groove of the cover when the cover is completely closed.
Figure 10:
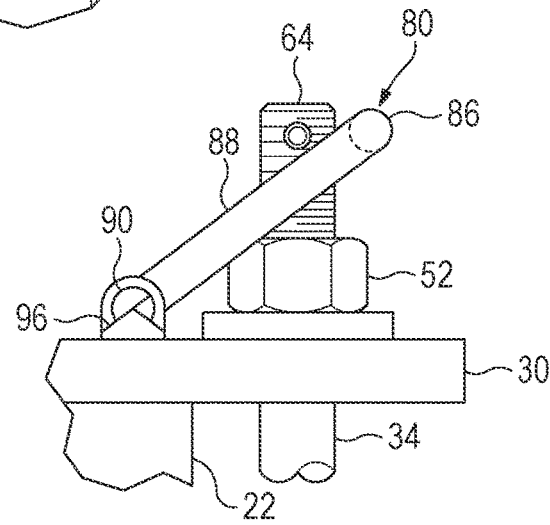
FIG. 10 is a partial side view of the manway assembly of FIG. 9, showing the interference member in an extended position and blocking the pivoting of the fastener away from the groove of the cover when the cover is completely closed.
Figure 11:
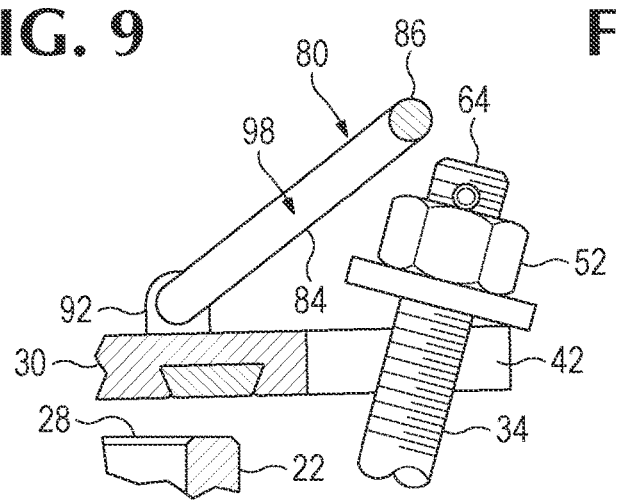
FIG. 11 is a sectional view of the manway assembly of FIG. 10 taken along lines 3-3 in FIG. 1, showing the interference member in the extended position and spaced from the fastener when the cover is partially open to allow pivoting of the fastener away from the groove of the cover.

Referring to FIGS. 9-11, interference member 80 prevents or blocks fastener 34 from pivoting from the secured position to the unsecured position (or from being removed from groove 42) when cover 30 is in the closed position regardless of whether interference member 80 is in the retracted position (such as shown in FIG. 9) or the extended position (such as shown in FIG. 10). In other words, when cover 30 is in the closed position, interference member 80 prevents or blocks fastener 34 in all possible positions of interference member 80 (as limited by pivot stop 96 when used). In the example shown in FIGS. 9-11, end portion 64 of fastener 34 contacts top portion 86 to prevent pivoting of fastener 34. However, when cover 30 is moved to the partially open position (such as shown in FIG. 11) and the pressure inside the tank car body is vented or exhausted, interference member 80 is spaced from fastener 34 relative to the closed position and allows a user to pivot fastener 34 from the secured position to the unsecured position (or allows the user to remove fastener 34 from groove 42) when interference member 80 is in the retracted position. In the example shown in FIGS. 9-11, end portion 64 of fastener 34 can go underneath top portion 86 of interference member 80, which is between first side portion 84 and second side portion 88, when cover 30 is in the partially open position. In other words, end portion 64 of fastener 34 moves through a passageway 98 defined between top portion 86 and cover 30 and between first side portion 84 and second side portion 88 when cover 30 is in the partially open position. When cover 30 is in the process of being moved to open position to the closed position, a user would need to move interference member 80 to the extended position (such as shown in FIG. 10) to pivot fastener 34 into groove 42.

Figure 12:
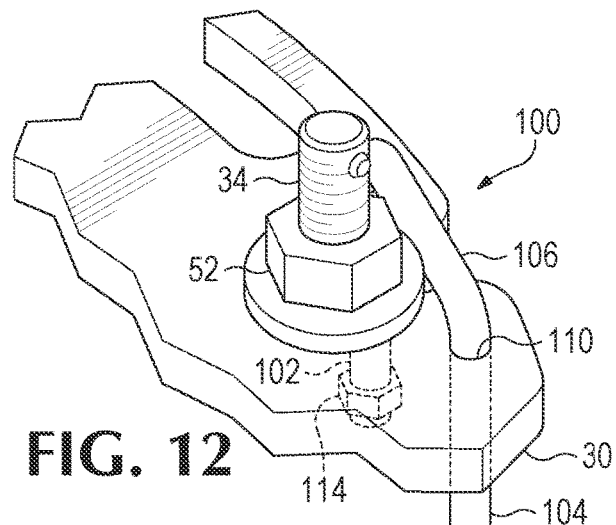
FIG. 12 is a partial view of the manway assembly of FIG. 1, showing another example of an interference member of the present disclosure.

Referring to FIG. 12, another example of interference member 36 is shown and generally indicated at 100. Unlike interference members 36, 62, and 68 (which are fixedly attached to cover 30) and interference member 80 (which is pivotably attached to cover 30), interference member 100 is slidably attached to cover 30. Interference member 100 includes a first side or end portion 102, a second side or end portion 104, and a central portion 106 disposed between the first and second end portions. Interference member 100 moves or slides relative to cover 30 such that interference member moves or slides between a retracted position in which central portion 106 is adjacent to cover 30, and an extended position in which central portion 106 is spaced from cover 30 relative to the retracted position. First and second end portions 102, 104 may be slidably received in apertures 108 and 110, respectively, of cover 30. In the example shown in FIGS. 12-15, first and second end portions 102, 104 each includes a plurality of threads 112 that receive nuts 114 to prevent removal of interference member 100. However, other examples of interference member 100 may alternatively, or additionally, include one or more other structures to prevent removal and detachment of the first and second end portions from cover 30, such as enlarged portions, pins, etc.

Figure 13:
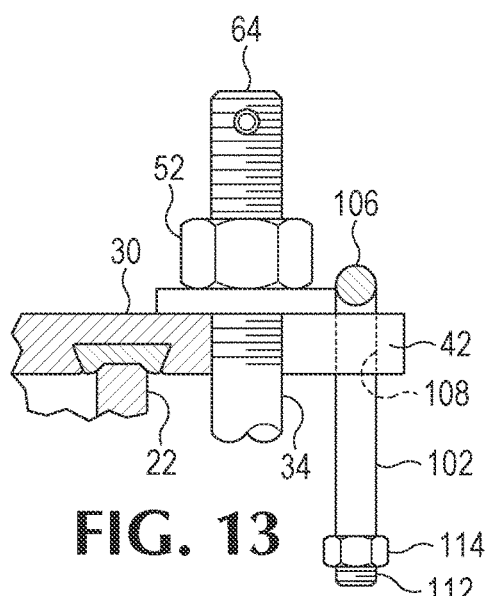
FIG. 13 is a sectional view of the manway assembly of FIG. 12 taken along lines 3-3 in FIG. 1, showing the interference member in a retracted position and blocking the pivoting of a fastener away from a groove of the cover when the cover is completely closed.
Figure 14:
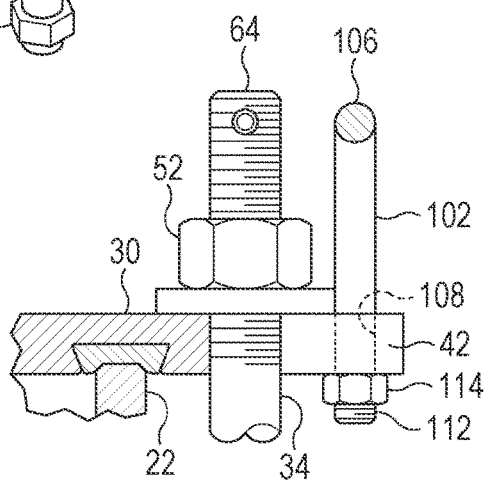
FIG. 14 is a sectional view of the manway assembly of FIG. 13 taken along lines 3-3 in FIG. 1, showing the interference member in an extended position and blocking the pivoting of the fastener away from the groove of the cover when the cover is completely closed.
Figure 15:
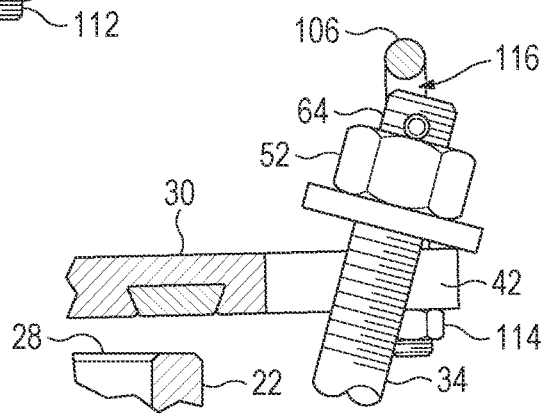
FIG. 15 is a sectional view of the manway assembly of FIG. 14 taken along lines 3-3 in FIG. 1, showing the interference member in the extended position and spaced from the fastener when the cover is partially open to allow pivoting of the fastener away from the groove of the cover.

Referring to FIGS. 13-15, interference member 100 prevents or blocks fastener 34 from pivoting from the secured position to the unsecured position (or from being removed from groove 42) when cover 30 is in the closed position regardless of whether interference member 100 is in the retracted position (such as shown in FIG. 13) or the extended position (such as shown in FIG. 14). In other words, when cover 30 is in the closed position, interference member 100 prevents or blocks fastener 34 in all possible positions of interference member 100 (as limited by nuts 114 when used). In the example shown in FIGS. 13-15, end portion 64 of fastener 34 contacts central portion 106 to prevent pivoting of fastener 34. However, when cover 30 is moved to the partially open position (such as shown in FIG. 15) and the pressure inside the tank car body is vented or exhausted, interference member 100 is spaced from fastener 34 relative to the closed position and allows a user to pivot fastener 34 from the secured position to the unsecured position (or allows the user to remove fastener 34 from groove 42) when interference member 100 is in the retracted position. In the example shown in FIGS. 13-15, end portion 64 of fastener 34 can go underneath central portion 106 of interference member 100, which is between first and second end portions 102, 104, when cover 30 is in the partially open position. In other words, end portion 64 of fastener 34 moves through a passageway 116 defined between central portion 106 and cover 30 and between first and second end portions 102, 104 when cover 30 is in the partially open position. When cover 30 is in the process of being moved to open position to the closed position, a user would need to move interference member 100 to the extended position (such as shown in FIG. 14) to pivot fastener 34 into groove 42. Although the example of FIGS. 12-15 shows a U-shaped interference member 100 slidably connected to cover 30, the interference member may instead be any suitable shape(s), such as L-, C-, and/or V-shaped.

Although particular examples of manway assemblies and interference members are shown, other examples may include any suitable combinations of the examples and/or various other structures and/or components. For example, the interference members of the present disclosure may be attached to the cover in any suitable ways, such as cast, welded, bolted, glued, or otherwise attached. Additionally, the interference members of the present disclosure may have one, two, three, or more portions attached to the cover. Moreover, cover 30 may be formed with the interference member(s) instead of attached to the cover. Furthermore, cover 30 may include two, three, four, five, or more interference members, and the interference members may be the same or different.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A manway assembly for a railroad tank car having a nozzle that defines an opening, the manway assembly comprising:
    a cover having a perimeter portion with a plurality of spaced grooves;
    a hinge attaching the cover to the nozzle so that the cover is pivoted among a plurality of positions including a closed position in which the opening is generally covered by the cover, a partially open position in which the pressure contained within the railroad tank car is vented, and a fully open position in which the opening is generally uncovered;
    a plurality of spaced fasteners pivotably attached to the nozzle adjacent to the opening so that each fastener of the plurality of spaced fasteners is pivoted between a secured position in which the fastener is received in a corresponding groove of the plurality of spaced grooves, and an unsecured position in which the fastener is spaced from the corresponding groove; and
    an interference member movably attached to the cover adjacent to at least one groove of the plurality of spaced grooves such that the interference member moves between a first position in which at least a portion of the interference member is adjacent the at least one groove and a second position in which the at least a portion of the interference member is spaced from the at least one groove relative to the first position, wherein the interference member is positioned to:
    (a) prevent pivoting of at least one fastener from the secured position to the unsecured position in the first and second positions when the cover is in the closed position;
    (b) prevent pivoting of the at least one fastener from the secured position to the unsecured position in the first position when the cover is in the partially open position; and
    (c) allow pivoting of the at least one fastener from the secured position to the unsecured position when the cover is in the partially open position and the interference member is in the second position.

2. The manway assembly of claim 1, wherein the interference member is slidably attached to the cover.

3. The manway assembly of claim 1, wherein the interference member is U-shaped.

4. The manway assembly of claim 1, wherein the at least one fastener is an eyebolt having a loop portion and a threaded stem portion.

5. The manway assembly of claim 4, wherein the loop portion is pivotably attached to the nozzle and the threaded stem portion is sized to be received in the corresponding groove.

6. The manway assembly of claim 1, wherein the interference member includes two spaced and parallel leg portions and a base portion that connects the leg portions.

7. The manway assembly of claim 6, wherein the base portion is perpendicular to the leg portions.

8. The manway assembly of claim 6, wherein the cover includes two spaced apertures with each apertures of the two apertures sized to receive a corresponding leg portion of the interference member such that the interference member slides between a first position in which the base portion is adjacent the at least one groove, and a second position in which the base portion is spaced from the at least one groove relative to the first position, wherein the base portion prevents pivoting of the at least one fastener from the secured position to the unsecured position when the interference member is in the first and second positions but the base portion allows pivoting of the at least one fastener from the secured position to the unsecured position when the cover is in the partially open position and the interference member is in the second position.

* * * * *